United States Patent
Simon

(10) Patent No.: US 11,549,617 B2
(45) Date of Patent: Jan. 10, 2023

(54) FEEDTHROUGH MODULE FOR INSTALLATION IN A WOODEN CONSTRUCTION

(71) Applicant: Hilti Aktiengesellschaft, Schaan (LI)

(72) Inventor: Sebastian Simon, Buchloe Lindenberg (DE)

(73) Assignee: Hilti Aktiengesellschaft, Schaan (LI)

( * ) Notice: Subject to any disclaimer, the term of this patent is extended or adjusted under 35 U.S.C. 154(b) by 107 days.

(21) Appl. No.: 17/250,104

(22) PCT Filed: Jul. 10, 2019

(86) PCT No.: PCT/EP2019/068517
§ 371 (c)(1),
(2) Date: Nov. 25, 2020

(87) PCT Pub. No.: WO2020/016073
PCT Pub. Date: Jan. 23, 2020

(65) Prior Publication Data
US 2021/0215277 A1   Jul. 15, 2021

(30) Foreign Application Priority Data
Jul. 17, 2018 (EP) .................................... 18183889

(51) Int. Cl.
*F16L 5/04* (2006.01)
*H02G 3/22* (2006.01)
(Continued)

(52) U.S. Cl.
CPC .................. F16L 5/04 (2013.01); H02G 3/22 (2013.01); *A62C 2/065* (2013.01); *H02G 3/0412* (2013.01)

(58) Field of Classification Search
CPC ........... F16L 5/04; H02G 3/22; H02G 3/0412; A62C 2/065
See application file for complete search history.

(56) References Cited

U.S. PATENT DOCUMENTS

RE31,428 E * 10/1983 Pedlow .................... H02G 3/22
428/494
4,901,488 A * 2/1990 Murota ..................... F16L 5/04
52/317
(Continued)

FOREIGN PATENT DOCUMENTS

CH        679 622 A5    3/1992
CH           679622 A *  3/1992 ................ F16L 5/04
DE    20 2015 000 505 U1    4/2015

OTHER PUBLICATIONS

Tran and White; Burning Rate of Solid Wood Measure in a Heat Release Rate Calorimiter, 1992, https://citeseerx.ist.psu.edu/viewdoc/download?doi=10.1.1.820.1973&rep=rep1&type=pdf.*
(Continued)

*Primary Examiner* — Brian E Glessner
*Assistant Examiner* — Adam G Barlow
(74) *Attorney, Agent, or Firm* — Grüneberg and Myers, PLLC

(57) ABSTRACT

A feedthrough module for cables, cable bundles, cable trays, pipes, pipelines, empty pipes and/or combinations thereof contains hardwood, softwood or mixtures thereof and is intended for installation in a tested and/or approved wooden wall and/or wooden ceiling construction in buildings. The tested and/or approved wooden wall and/or wooden ceiling construction has an equal or lower burn rate than the feedthrough module. The feedthrough module has a cuboid body having edge lengths a, b, c, wherein c represents the edge length corresponding to the installation thickness (D) of the feedthrough module, and wherein the feedthrough module has a nominal burn rate of 0.7 mm/min or less.

18 Claims, 1 Drawing Sheet

(51) Int. Cl.
  *A62C 2/06*    (2006.01)
  *H02G 3/04*    (2006.01)

(56) References Cited

U.S. PATENT DOCUMENTS

| | | | | |
|---|---|---|---|---|
| 5,347,767 | A * | 9/1994 | Roth | F16L 5/04 |
| | | | | 52/220.8 |
| 8,636,076 | B2 * | 1/2014 | Cordts | H02G 3/0412 |
| | | | | 169/48 |
| 2004/0149390 | A1 * | 8/2004 | Monden | F16L 5/04 |
| | | | | 156/391 |
| 2005/0133242 | A1 * | 6/2005 | Kreutz | F16L 5/04 |
| | | | | 174/654 |
| 2005/0150677 | A1 * | 7/2005 | Hochstim | F16L 5/04 |
| | | | | 174/661 |
| 2006/0138251 | A1 * | 6/2006 | Stahl | A62C 3/16 |
| | | | | 239/271 |
| 2007/0066745 | A1 * | 3/2007 | Beele | A62C 2/065 |
| | | | | 524/495 |
| 2007/0169963 | A1 * | 7/2007 | Beele | H02G 3/0412 |
| | | | | 174/650 |
| 2011/0088917 | A1 * | 4/2011 | Lee | F16L 5/14 |
| | | | | 169/48 |
| 2012/0097405 | A1 * | 4/2012 | Cordts | F16L 5/04 |
| | | | | 169/45 |
| 2013/0068487 | A1 * | 3/2013 | Klein | A62C 2/065 |
| | | | | 169/48 |
| 2013/0086856 | A1 * | 4/2013 | Paetow | A62C 2/065 |
| | | | | 52/232 |
| 2018/0259095 | A1 * | 9/2018 | Schulz-Hanke | F16L 5/025 |
| 2019/0271416 | A1 * | 9/2019 | Münzenberger | B32B 3/12 |
| 2019/0305539 | A1 * | 10/2019 | Schulz-Hanke, Sr. | H02G 3/22 |
| 2019/0366135 | A1 * | 12/2019 | Münzenberger | H02G 3/0412 |
| 2019/0374799 | A1 * | 12/2019 | Münzenberger | A62C 2/065 |
| 2020/0347965 | A1 * | 11/2020 | Simon | H02G 3/0412 |
| 2021/0215277 | A1 * | 7/2021 | Simon | F16L 5/04 |
| 2022/0118296 | A1 * | 4/2022 | Juzak | A62C 2/12 |

OTHER PUBLICATIONS

International Search Report dated Oct. 16, 2019 in PCT/EP2019/068517 with English translation, 6 pages.
Written Opinion dated Oct. 16, 2019 in PCT/EP2019/068517 with English translation, 11 pages.
Gilka-Bötzow et al., "*Zur Abbrandrate von Holz in Abhängigkeit der Rohdichte*," European Journal of Wood and Wood Products, Springer Verlag, 2010, 69 (1), pp. 159-162, 9 pages.
ISO 5660-1:2015 "*Reaction-to-fire tests—Heat release, smoke production and mass loss rate—Part 1: Heat release rate (cone calorimeter method) and smoke production rate (dynamic measurement)*," International Standard, ISO 5660-1, Third Edition Mar. 15, 2015, 67 pages.

* cited by examiner

FEEDTHROUGH MODULE FOR INSTALLATION IN A WOODEN CONSTRUCTION

This application is the National Stage entry under § 371 of International Application No. PCT/EP2019/068517, filed on Jul. 10, 2019, and which claims the benefit of European Application No. 18183889.7, filed on Jul. 17, 2018. The content of each of these applications is hereby incorporated by reference in their entirety.

BACKGROUND OF THE INVENTION

Field of the Invention

The invention relates to a fire protection solution in the form of a feedthrough module for cables, cable bundles, cable trays, pipes, pipelines and/or empty pipes, as well as combinations thereof, that is intended for installation in wooden wall and/or wooden ceiling constructions in buildings, which solution dispenses with the use of non-wood-like material such as dry construction materials, mineral materials and metal materials.

Description of Related Art

Nowadays, when installing feedthroughs for cables, cable bundles, cable trays, pipes, pipelines, empty pipes and/or combinations thereof that have specific requirements for fire protection, two installation methods are used in principle. The first method comprises encapsulating the surrounding wooden material with non-combustible materials, such as plasterboard, followed by installing a mortar barrier, which means that the feedthrough is located in a non-combustible material, and is therefore treated like a feedthrough in massive construction. The second method comprises encapsulating the surrounding wooden material with non-combustible materials, followed by installing a soft barrier or mineral wool block. The actual feedthrough is then installed therein.

In these two methods, another material of a different type is used in addition to the wood material. When mortar is used in addition to a further material, this also introduces water into the building site or construction, which leads to swelling and shrinkage in the adjoining wood, and thus leads to dimensional instability. In addition, the introduction of water into buildings or constructions can also cause mold or other microbial infestations.

When using mineral wool, in particular in combination with an encapsulating frame, the possibility of adjacent wooden surfaces burning cannot be ruled out, and therefore, in the event of a fire, the passage of smoke or hot gases must be expected on the wooden surface, or this surface also has to be protected. In the case of mineral wool products, the joint must always be filled with mineral wool on site, which entails an increased workload and, in the case of open building sites, a strong dependency on the weather.

Another disadvantage of the two methods is the resulting change in aesthetics. Therefore, in a building which has been manufactured from aesthetic wood, the visual effect desired by the architect is broken. In addition, an installation of this kind is of course very labor and material intensive.

Systems for connecting wooden components to other non-wood-like components are known. WO 18011329 A1 describes a system for connecting wooden structural elements to building elements and EP 1 626 149 A2 describes a flat connection for fire protection glazing. DE 20 2007 013237 U1 describes a module for feeding through a flue gas-carrying pipe comprising additional non-wood-like insulation material.

SUMMARY OF THE INVENTION

The problem addressed by the invention is that of providing a feedthrough module for cables, cable bundles, cable trays, pipes, pipelines, empty pipes and/or combinations thereof that is installed in various wooden wall and/or wooden ceiling constructions and provides a predetermined fire protection performance, wherein the use of non-wood-like material such as dry construction materials, mineral materials and metal materials is dispensed with on the installation surface. A further problem addressed by the invention is that of providing a feedthrough module that avoids the use of encapsulations and prevents water and moisture from penetrating into a wooden wall and/or wooden ceiling construction. Another problem addressed by the invention is that of providing a feedthrough module that can be universally installed in wooden wall and/or wooden ceiling constructions and ensures reliable fire and smoke protection. Another problem addressed by the invention is that of providing a fire protection solution in the form of a feedthrough module which can be introduced into a tested and/or approved wooden wall and/or wooden ceiling construction. Another problem addressed by the invention is that of providing a feedthrough module that allows flexible dimensioning of the feedthrough surface.

In order to solve these problems, a feedthrough module for cables, cable bundles, cable trays, pipes, pipelines, empty pipes and/or combinations thereof that is intended for installation in a wooden wall and/or wooden ceiling construction in buildings is provided.

The present invention therefore relates to a feedthrough module for cables, cable bundles, cable trays, pipes, pipelines, empty pipes and/or combinations thereof that consists of hardwood, softwood or mixtures thereof and is intended for installation in a tested and/or approved wooden wall and/or wooden ceiling construction in buildings, wherein the tested and/or approved wooden wall and/or wooden ceiling construction has an equal or lower burn rate than the feedthrough module, wherein the feedthrough module has a cuboid body having edge lengths a, b, c, wherein c represents the edge length corresponding to the installation thickness (D) of the feedthrough module, and wherein the feedthrough module has a nominal burn rate of 0.7 mm/min or less, measured using a cone calorimeter in accordance with ISO 5660.

DETAILED DESCRIPTION OF THE PREFERRED EMBODIMENTS

Figure 1:
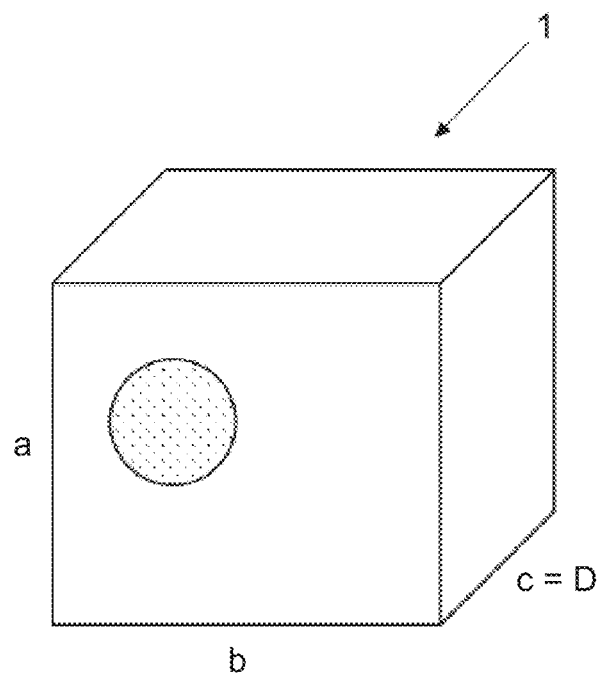
FIG. 1 is a perspective view of a feedthrough module according to the invention.

If the wooden wall and/or wooden ceiling construction is a sandwich construction, it is preferred that the tested and/or approved wooden wall and/or wooden ceiling construction has an equal or lower average burn rate than the feedthrough module.

The feedthrough module of the present invention preferably consists of a wood having a defined fire behavior, for example having a burn rate of 0.7 mm/min. In particular, the feedthrough module consists of a wood selected from the group consisting of beech, oak, ash, spruce, pine, larch, birch and mixtures thereof. The feedthrough module preferably consists of glulam, plywood or cross-laminated timber. The feedthrough module particularly preferably consists of cross-laminated timber, which is also known as CLT.

The feedthrough module is suitable as a fire protection solution for feeding cables, cable bundles, cable trays, pipes, pipelines, empty pipes and/or combinations thereof through a wooden wall and/or wooden ceiling construction in buildings. The feedthrough module is particularly suitable as a universal fire protection solution for tested and/or approved wooden walls or wooden ceilings.

Examples of wooden walls in which the feedthrough module is installed are Brettstapel or log construction walls, panel construction walls, cross-laminated timber walls, glulam walls or plywood walls. In this case it is irrelevant whether these walls are planked or unplanked or comprise additional superstructures, for example for acoustic properties. Cross-laminated timber walls, glulam walls or plywood walls are preferred, with cross-laminated timber walls being particularly preferred.

It is essential to the invention that the wall which is to be penetrated has an equal or lower burn rate than that of the installed feedthrough module. This preferably has a burn rate of 0.7 mm/min or less.

If the wooden wall and/or wooden ceiling construction is a sandwich construction, it is preferred that the tested and/or approved wooden wall and/or wooden ceiling construction has an equal or lower average burn rate than the feedthrough module.

Examples of ceilings in which the feedthrough module is installed are ceilings having girders or beams, ribbed or coffered ceilings, Brettstapel ceilings, cross-laminated timber ceilings, glulam ceilings or plywood ceilings. Brettstapel ceilings, cross-laminated timber ceilings, glulam ceilings or plywood ceilings are preferred, with cross-laminated timber ceilings being particularly preferred.

The feedthrough module preferably has a cuboid body having edge lengths a, b, c, wherein a represents the edge length of the height, b represents the edge length of the width, and c represents the edge length of the depth of the feedthrough module, wherein c is equivalent to the installation thickness (D) of the feedthrough module.

The installation thickness (D) of the feedthrough module for different fire protection target times is calculated according to the following formula:

$$D = \text{burn rate [mm/min]} \times \text{fire duration [min]} \times G;$$

where G represents a safety factor of at least ≥1.5.

G is preferably in a range of from ≥1.5 to ≤3.0. G is more preferably in a range of from G≥1.6 to ≤2.5. G is particularly preferably ≥2.0. This ensures that, when G=2, the cables, cable bundles, cable trays, pipes, pipelines, empty pipes and/or combinations thereof that are introduced into the feedthrough module are left with at least half of the wooden material as a stopping point. With a safety factor of G=1 and a corresponding installation thickness, reliable fire protection cannot be guaranteed, since the structure can be expected to burn down or burn through completely.

In a preferred embodiment. (D) is in a range of from 100 mm to 180 mm. (D) is preferably in a range between 130 and 160 mm, particularly preferably (D) is in a range between 140 and 150 mm, and most preferably (D) is 150 mm.

In a preferred embodiment, the edge lengths a and b are at least 125 mm or more. This is the technical minimum that is required to feed through a cable with reasonable edge distances. Preferably, a and b are between 200 and 600 mm, particularly preferably a and b are between 300 and 500 mm, and most preferably a and b are 300 mm. The edge lengths a and b of the feedthrough module can also be different lengths.

Moreover, it is preferred that the cable, cable bundle, cable tray, pipe, pipeline, empty pipe and/or the combinations thereof that are to be fed through are positioned and mounted at a minimum distance (f) of 30 mm. preferably 50 mm, away from the outer edges of the cuboid body, which distance is also called the edge distance. In addition to reliable fire and smoke protection, this ensures in particular the dimensional stability and guarantees the static stability which is necessary for mechanical fastening. An edge length of a and/or b is therefore produced from the required edge distances. The minimum distance of the installation from the edge of the feedthrough module has to be greater than or equal to 30 mm, preferably greater than or equal to 50 mm. At smaller distances, twisting and possibly reduced stability of the feedthrough module can be expected, which leads to reduced fire protection performance. Optionally, the top layer of the wooden wall and/or wooden ceiling construction can also project beyond the edge of the installed feedthrough module, as a result of which a more uniform aesthetic can be achieved.

The feedthrough module of the present invention for cables, cable bundles, cable trays, pipes, pipelines, empty pipes and/or combinations thereof is installed in a tested and/or approved wooden wall and/or wooden ceiling construction. In this case a flush connection to the construction wood has to be established. The flush connection to the construction wood is created by connecting the feedthrough module to the primary wooden construction element using connectors or joining elements that are not exposed to the fire source during the fire test in such a way that the connectors or joining elements are not exposed to the fire over a defined period of time. This connection is preferably established via a screw or nail connection. Connections by means of bolts, rivets, threaded rods, wooden dowels, clamps, high-temperature-resistant adhesive bonds, such as potassium water glasses, or other carpentry connections are also conceivable. A connection using steel or stainless steel screws is particularly preferred. These can also be galvanized or passivated. Passivation ensures that the screws retain their corrosion protection in the wood.

In a particularly preferred embodiment, the feedthrough module is connected to the primary wooden construction element by means of a recessed installation—concealed screw connection. In the case of a recessed installation, the wood material is used as protection against direct exposure of the connector material to the fire, which is known to the person skilled in the art and can be determined by means of the nominal burn rate.

The feedthrough module is preferably fastened in the surrounding wooden wall and/or wooden ceiling construction at every ⅓ of c so as to have at least two fastening points per side, particularly preferably so as to have at least one fastening point per side at half the installation depth.

In addition, the feedthrough module for cables, cable bundles, cable trays, pipes, pipelines, empty pipes and/or combinations thereof that consists of hardwood, softwood or mixtures thereof represents a universal fire protection solution for a tested and/or approved wooden wall and/or wooden ceiling construction in buildings. In particular, the feedthrough module is a fire protection solution for a tested and/or approved wooden wall and/or wooden ceiling construction in buildings, wherein the tested and/or approved wooden wall and/or wooden ceiling construction has an equal or lower burn rate than the feedthrough module, wherein the feedthrough module has a cuboid body having edge lengths a, b, c, wherein c represents the edge length corresponding to the installation thickness (D) of the feedthrough module, and wherein the feedthrough module has a nominal burn rate of 0.7 mm/min or less.

Figure 2:
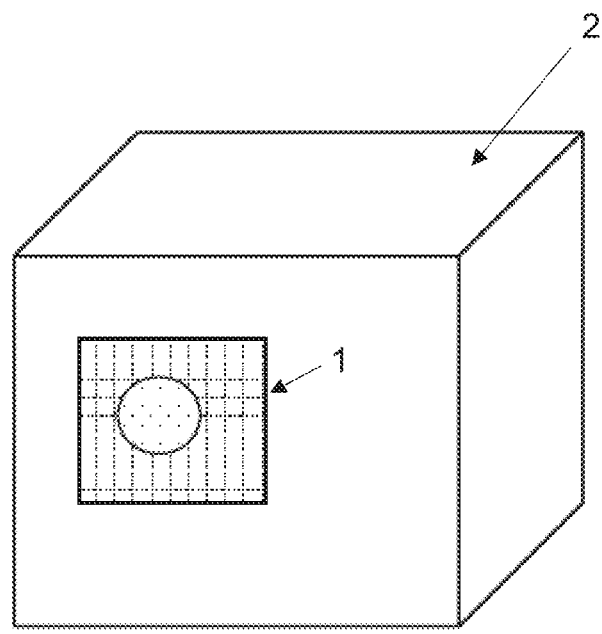
FIG. 2 is a perspective view of a feedthrough module according to the invention when installed in a wooden wall construction.

The invention is explained in greater detail by the following example in conjunction with the accompanying figures, in which:

FIG. 1 is a perspective view of a feedthrough module according to the invention, and FIG. 2 is a perspective view of a feedthrough module according to the invention when installed in a wooden wall construction.

FIG. 1 shows an embodiment of the feedthrough module of the present invention. The feedthrough module 1 has a cuboid body having edge lengths a, b, c, wherein c is the edge length corresponding to the installation thickness (D). The feedthrough K for cables, cable bundles, cable trays, pipes, pipelines, empty pipes and/or combinations thereof that are to be fed through is positioned and mounted at a minimum distance (f) of approximately 50 mm away from the outer edges of the cuboid body.

In FIG. 2, the feedthrough module 1 is installed in a wooden wall construction 2. The reference signs are the same as for FIG. 1.

Classification test of the feedthrough module: A fire protection sleeve, such as CFS-SL from Hilti (Ø 113 mm), having A and B cables (cable outer diameter Ø≤21 mm) is installed (Ø 120 component opening having annular gap sealing material, for example fire protection sealing compound CFS-S ACR from Hilti) in a feedthrough module, also known as a block, which is made of cross-laminated timber and has the thickness of d=148 mm (installation thickness (D) equal to edge length c). These have a fire resistance class, according to EN 13501-2, of EI 90. The approved wooden wall element to be penetrated also has a fire resistance class of EI 90 ("Leno cross-laminated timber" type ETA-10/0241). The feedthrough module has a side edge length a×b of 300×300 mm. The feedthrough module is fastened in the surrounding wooden wall element by means of a concealed screw connection at every ⅓ of c so as to have two fastening points per side. Classification tests according to EN 13501-2:2016 have shown that the feedthrough module installed by means of concealed screw connections also achieves a fire resistance class of EI 90 in the overall component. These demonstrate that the module can be universally used as a fire protection solution in various tested and/or approved wooden wall and/or wooden ceiling constructions.

It has been shown that the feedthrough module of the present invention produces a predetermined fire protection performance and can therefore be universally used as a fire protection solution in various tested and/or approved wooden wall and/or wooden ceiling constructions. The feedthrough module is suitable for cables, cable bundles, cable trays, pipes, pipelines, empty pipes and/or combinations thereof. Another advantage shown is that the use of non-wood-like material such as dry construction materials, mineral materials and metal materials can be dispensed with on installation surfaces. Water and moisture is prevented from penetrating into a wooden wall and/or wooden ceiling construction. Ultimately, it has been shown that the feedthrough module of the present invention allows flexible dimensioning of the feedthrough surface.

It has also been shown that the feedthrough module for cables, cable bundles, cable trays, pipes, pipelines, empty pipes and/or combinations thereof that consists of hardwood, softwood or mixtures thereof represents a universal fire protection solution for a tested and/or approved wooden wall and/or wooden ceiling construction in buildings. In particular, it has been shown that the feedthrough module is a fire protection solution for a tested and/or approved wooden wall and/or wooden ceiling construction in buildings, wherein the tested and/or approved wooden wall and/or wooden ceiling construction has an equal or lower burn rate than the feedthrough module, wherein the feedthrough module has a cuboid body having edge lengths a, b, c, wherein c represents the edge length corresponding to the installation thickness (D) of the feedthrough module, and wherein the feedthrough module has a nominal burn rate of 0.7 mm/min or less.

The invention claimed is:

1. A feedthrough module for cables, cable bundles, cable trays, pipes, pipelines, empty pipes and/or combinations thereof, the feedthrough module comprising:

a body comprising hardwood, softwood or mixtures thereof suitable for installation in a tested and/or approved wooden wall and/or wooden ceiling construction in buildings, wherein the body has a burn rate greater than the tested and/or approved wooden wall and/or wooden ceiling construction body having edge lengths a, b, c, wherein c represents the edge length corresponding to an installation thickness (D) of the feedthrough module, wherein the body of the feedthrough module has a nominal burn rate of 0.7 mm/min or less, measured using a cone calorimeter in accordance with ISO 5660, and wherein the installation thickness (D) of the body of the feedthrough module for different fire protection target times is calculated according to the following formula:

$$D = \text{burn rate [mm/min]} \times \text{fire duration [min]} \times G;$$

where G represents a safety factor of at least ≥1.5.

2. The feedthrough module according to claim 1, wherein a represents the edge length of the height, b represents the edge length of the width, and c represents the edge length of the depth of the feedthrough module, wherein c is equivalent to the installation thickness (D) of the feedthrough module.

3. The feedthrough module according to claim 1, wherein the edge lengths a and b are at least 125 mm or more.

4. The feedthrough module according to claim 1, wherein G≥2.0.

5. The feedthrough module according to claim 1, wherein the body of the feedthrough module comprises glulam, plywood or cross-laminated timber.

6. The feedthrough module according to claim 1, wherein the feedthrough module comprises a wood selected from the group consisting of beech, oak, ash, spruce, pine, larch, birch and mixtures thereof.

7. The feedthrough module according to claim 1, wherein:

the body includes an opening through which the cable, cable bundle, cable tray, pipe, pipeline, empty pipe and/or the combination thereof are to be fed through, and the opening is configured to position the cable, cable bundle, cable tray, pipe, pipeline, empty pipe and/or the combination thereof at a minimum distance of 30 mm away from an outer edge of the body.

8. The feedthrough module according to claim 1, wherein the tested and/or approved wooden wall construction is a cross-laminated timber wall, glulam wall or plywood wall.

9. The feedthrough module according claim 1, wherein the tested and/or approved wooden ceiling construction is a Brettstapel ceiling, cross-laminated timber ceiling, glulam ceiling or plywood ceiling.

10. The feedthrough module according to claim 1, wherein (D) is in a range of from 100 mm to 180 mm.

11. A method for installing the feedthrough module according to claim 1 in a tested and/or approved wooden wall and/or wooden ceiling construction, comprising:
    establishing a flush connection to the wooden wall and/or wooden ceiling construction by a connection of bolts, rivets, threaded rods, wooden dowels, clamps, high-temperature-resistant adhesive bonds or other carpentry connections.

12. The method according to claim 11, wherein the connection is established at every ⅓ of the edge length c so as to have at least two fastening points per side.

13. A method for solving universal fire protection for a tested and/or approved wooden wall and/or wooden ceiling construction in buildings, comprising: installing the feedthrough module according to claim 1.

14. A feedthrough module, comprising:
    a body comprising a first material;
    an area of the body including an opening,
    wherein the body is configured to be in a construction surface in an installed state and the opening is configured to allow a line to pass through the construction surface, the body comprising a second material different from the first material and having a burn rate greater than a burn rate of the construction surface, wherein the body has an installation thickness (D) for different fire protection target times that is calculated according to the following formula:

$$D = \text{burn rate [mm/min]} \times \text{fire duration [min]} \times G;$$

where G represents a safety factor of at least ≥1.5.

15. The feedthrough module according to claim 14, wherein the body of the feedthrough module has a nominal burn rate of 0.7 mm/min or less, measured using a cone calorimeter in accordance with ISO 5660.

16. The feedthrough module according to claim 14, wherein:
    the first material is wood, and
    the second material is a different wood from the first material or is a non-wooden material.

17. The feedthrough module according to claim 14, wherein a distance between an edge of the opening and an edge of the body is greater than or equal to 30 mm.

18. The feedthrough module according to claim 14, wherein G is about 2.

* * * * *